Oct. 23, 1951 C. A. MARTIN 2,572,042
MEANS FOR MOUNTING CUTTING BLADES ON SHAFTS
Filed July 13, 1948 2 SHEETS—SHEET 1
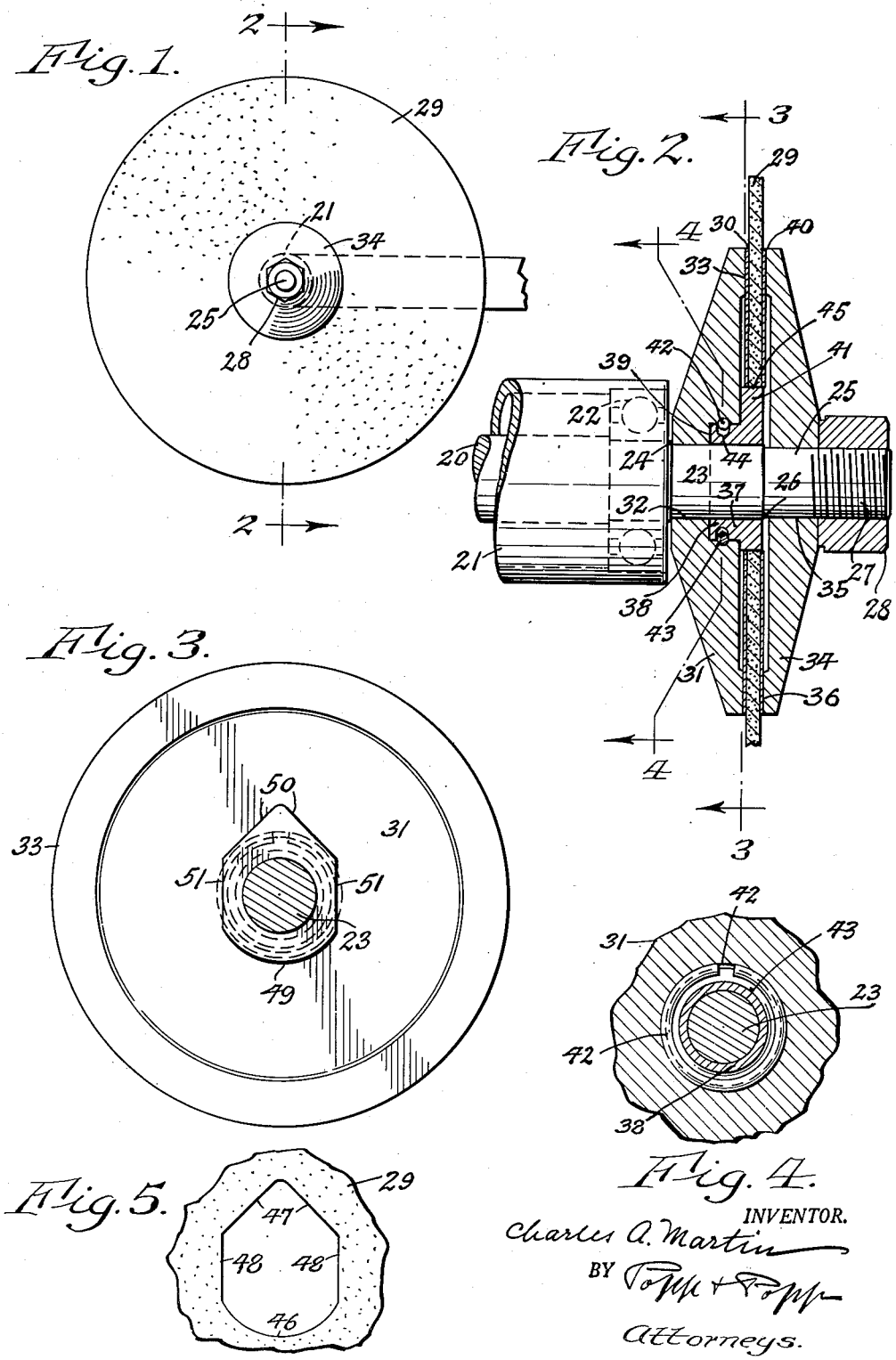
INVENTOR.
Charles A. Martin
BY Popp & Popp
Attorneys.

Oct. 23, 1951          C. A. MARTIN          2,572,042
MEANS FOR MOUNTING CUTTING BLADES ON SHAFTS
Filed July 13, 1948          2 SHEETS—SHEET 2
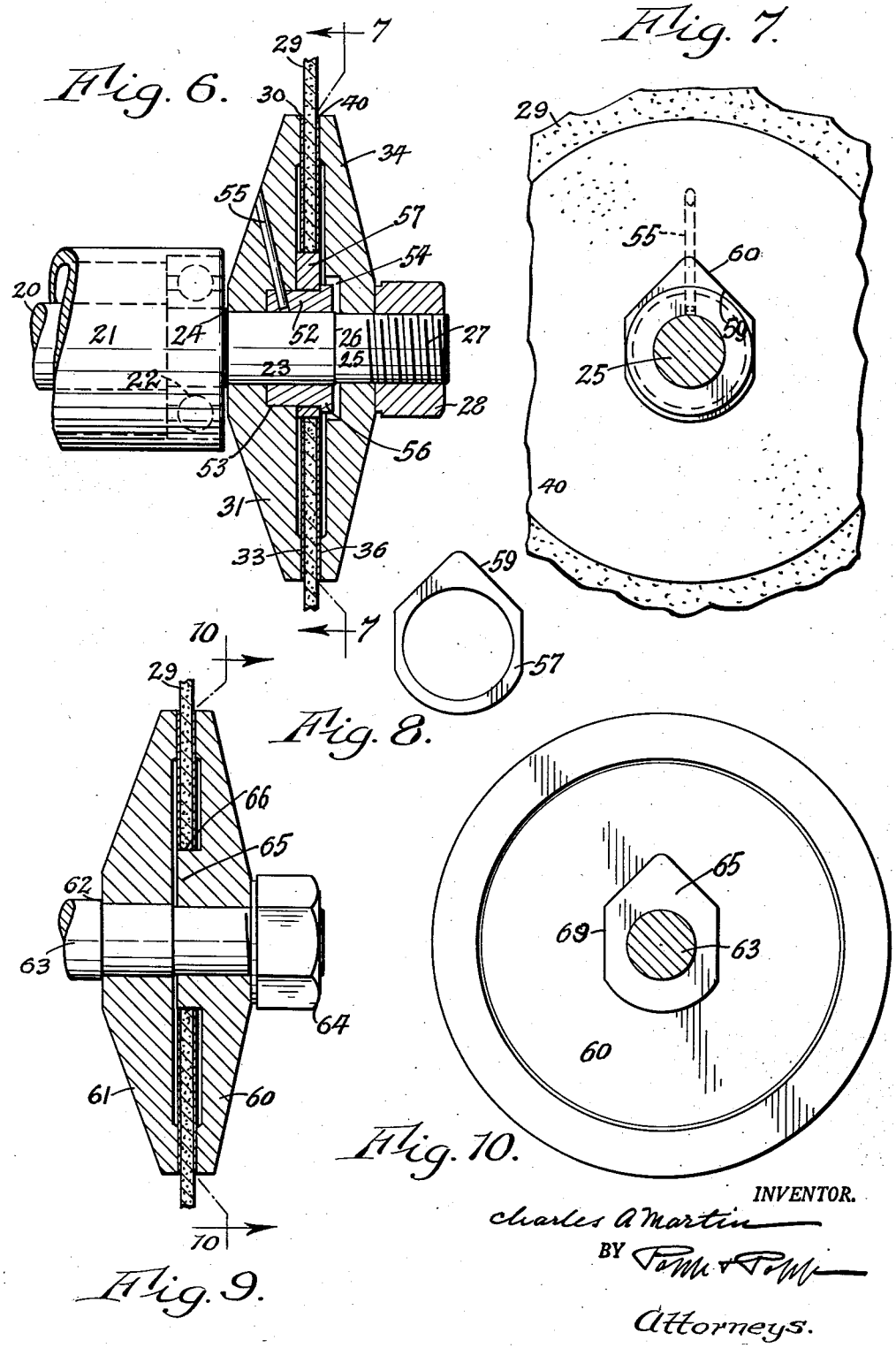
INVENTOR.
Charles A. Martin
BY
Attorneys.

Patented Oct. 23, 1951

2,572,042

UNITED STATES PATENT OFFICE 2,572,042

MEANS FOR MOUNTING CUTTING BLADES ON SHAFTS

Charles A. Martin, Buffalo, N. Y.

Application July 13, 1948, Serial No. 38,456

2 Claims. (Cl. 51—168)

This invention relates to means for mounting a circular flat cutting blade of abrasive material, or the like, on a rotary spindle or shaft which drives the blade.

In the use of such blades for cutting tile, building blocks and similar articles it is desirable to permit a moderate amount of slippage of the blade relative to the spindle or shaft in order to avoid a dead stop of the blade and possible breakage of the same in case the blade encounters unusual resistance when striking an abnormally hard spot on the work piece or for other reasons.

This slippage of the cutting blade on the spindle is desirable because it absorbs the shock of the sudden load which is imposed on the blade when the same hits a hard spot on the work and thereby prevents destruction of the blade which is expensive due, not only to the cost of replacement, but also due to the loss of time and output of the cutting machine while the same is idled for making this repair.

Heretofore these blades have been so mounted on the spindle that the same during such slippage turned directly on the spindle, and as such slippage occurs frequently when the cutting machine is in use, that part of the spindle engaged by the abrasive blade was worn very rapidly and necessitated unduly frequent renewal of the spindle.

It is therefore the object of this invention to provide means for mounting an abrasive cutting blade on a driving spindle by means which will effectively turn the blade during normal cutting operations but enable the same to slip without wearing the spindle when rotation of the blade is retarded by engaging a hard spot in the work piece and which is also so organized that the blade does not turn directly on the spindle and wear the same, thereby avoiding unduly frequent repairing of the spindle.

In the accompanying drawings:

Fig. 1 is a side elevation showing a circular cutting blade mounted on a spindle in accordance with one form of this invention.

Fig. 2 is a vertical longitudinal section, on an enlarged scale, taken on line 2—2, Fig. 1.

Fig. 3 is a vertical transverse section taken on line 3—3, Fig. 2.

Fig. 4 is a fragmentary vertical transverse section taken on line 4—4, Fig. 2.

Fig. 5 is a fragmentary side elevation of the cutting blade shown in Figs. 1 and 2 with the cushioning sheet omitted.

Fig. 6 is a vertical longitudinal section showing a modified form of this invention.

Fig. 7 is a vertical transverse section taken on line 7—7, Fig. 6.

Fig. 8 is a side view of the blade protecting member, shown in Figs. 6 and 7.

Fig. 9 is a vertical longitudinal section showing another modification of this invention.

Fig. 10 is a vertical cross section taken on line 10—10, Fig. 9.

In the following description like reference characters indicate the same parts in the several figures of the drawings.

Referring to the construction of this invention, shown in Figs. 1 to 5, the numeral 20 represents the body of a driving spindle or shaft which is adapted to be rotated by any suitable means and upon which the abrasive cutting or sawing blade is mounted in accordance with this invention. This spindle is mounted for rotation on any suitable support, such as the tube 21 forming part of the machine which includes this blade, this spindle being journaled in the tube by a ball bearing 22 of well-known construction.

Near one end of this shaft the same is reduced so as to form an intermediate cylindrical neck 23 of smaller diameter than the shaft and also an outwardly facing annular shoulder 24 between this neck and the body of the shaft; and the extreme end of this shaft is further reduced from a cylindrical stem 25 of smaller diameter and an annular shoulder 26 between the neck and stem. The outer end of this stem is provided with an external screw thread 27 which receives a clamping nut 28.

The numeral 29 represents a cutting blade or saw which preferably has the form of a disk and made of abrasive material suitable for use in cutting tile, building blocks and the like, but this blade may be constructed of any other material best suited for the particular work which is to be cut.

This cutting blade or disk is provided with a central opening and around this opening the same is provided on its opposite sides with sheet facings 30, 40 of paper, cardboard or similar material which form cushioning and gripping surfaces for engagement by the parts whereby this blade is mounted on the shaft.

The means shown in Figs. 1 to 5 for mounting this blade on the shaft are constructed as follows:

The numeral 31 represents a rear clamping member which preferably has the form of a disk or flange and is provided with a central opening 32 whereby the same is mounted on the cylindrical periphery of the intermediate neck 23 of the driving shaft. The outer side of this rear clamping member engages with the shoulder 24 between the body 20 of the driving shaft and the intermediate neck 23 thereof. Adjacent to the periphery of this rear clamping member the same is provided on its inner side with an annular raised clamping face or jaw 33 which engages with the gripping sheet or cushioning member 30 on the rear side of the saw blade.

The numeral 34 represents a front clamping member which also has the form of a disk or flange and provided with a central opening 35 whereby the same is mounted on the cylindrical periphery of the reduced stem 25 of the driving spindle. Adjacent to its periphery this front clamping member is provided on its inner side with a raised annular clamping face or jaw 36 which engages with the cushion 40 on the front side of the saw blade, as shown in Fig. 2.

The front side of the front clamping member is engaged by the clamp nut 28 the tightening of which to a sufficient extent will cause the rear clamping disk to bear against the shoulder 24 and the front and rear clamping disk to bear against the cushioning sheets 30, 40 on opposite sides of the blade with sufficient force to cause this blade to turn with the driving shaft under normal conditions during which the saw blade only encounters a normal resistance during the operation of rotating this blade in engagement with a work piece, such as tile, a building block or the like.

When the rotation of the saw blade engages with a hard part or spot in the work piece and its forward movement stopped or retarded the same is premitted to lag behind the rotation of the driving shaft in order to avoid placing undue strain on the saw blade and breaking the same. The time when such lag or slipping action of the blade relative to the shaft occurs is determined by the tightness of the grip of the clamping disks against opposite sides of the cutting blade and the frictional engagement of the rear and front clamping disks against the shoulder 24 of the shaft and the clamping nut 27 mounted on the front end of the shaft.

Heretofore the cutting blade or saw engaged with the bore of its central opening directly against the periphery of the cylindrical neck 23 of the spindle which is objectionable because the turning of the blade on this part of the spindle caused the latter to become worn unduly rapidly and therefore necessitated frequent repairing of the shaft for the purpose of maintaining this device in best operative condition and preventing the blade from becoming misplaced on the spindle and causing breakage thereof by continuous use of the same while the spindle is worn.

In order to avoid this wear on the spindle when the cutting blade slips or lags behind the rotation of the spindle protective means have been provided whereby the cutting blade is mounted indirectly on the shaft and permit the same to slip relative thereto without actually engaging the shaft and still maintain the blade in a concentric position on the shaft so that the same will operate on the work piece effectively without liability of becoming broken. The means for accomplishing this purpose in accordance with this invention, as shown in Figs. 1 to 5 are constructed as follows:

Between the opposing central parts of the clamping disk or flanges is arranged a protecting member which preferably comprises a central tubular member or sleeve 37 having a cylindrical bore which turns on the cylindrical periphery of the neck 23 of the driving spindle. The rear part of this sleeve has the form of a hub 38 which projects into a cylindrical recess 39 formed on the inner side of the central part of the rear clamping disk 31 concentrically around the axis of the driving shaft, while the front part of this sleeve is provided with a coupling head 41 which is arranged between the opposing central parts of the rear and front clamping disks, as shown in Fig. 2. This protecting member is constructed of non-abrasive material, such as iron or steel, and it is coupled with the rear clamping disk by means which hold this protecting member in an assembled position with the rear clamping disk and prevent axial movement relative to this disk, but permitting this member to turn freely on the cylindrical neck of the driving shaft. This is preferably accomplished by a split retaining or coupling ring 42 of spring material which engages its outer part with an annular groove 43 in the bore of the recess 39 while its inner part projects into an annular groove 44 on the periphery of the hub 38, as shown in Figs. 2 and 4. When assembling these parts the retaining ring is contracted sufficiently after being placed in the annular groove 44 of the hub 38 so that this ring can be inserted in the bore of the recess 39 and permit this protecting sleeve to be inserted axially in this recess. When this sleeve has been moved a sufficient extent into this recess to bring a retaining ring into line with the annular groove 42 of the rear clamping disk, this ring will expand due to its resilience and engage its outer part with the groove 42 and still retain its inner part within the groove 44 in which position this ring extends across the joint between the hub 38 and the adjacent part of the rear clamping disk and form a lock or coupling which prevents the protecting member from being withdrawn from the rear clamping disk.

The periphery of the head 41 engages with the bore of an opening 45 in the center of the cutting blade, the contour of this periphery and bore being of non-circular shape so that when this periphery and bore engage with each other a coupling effect is produced which will prevent these members turning one relative to the other. This non-circular formation of the co-operating surface of the periphery of the coupling head and the bore of the coupling opening in the cutting blade, may be of various shapes, but as shown in Figs. 3 and 5 the coupling opening of the cutting disk is formed as to provide a curved part 46 on one of the sides of this opening which is concentric with the axis of the driving shaft and the cutting blade, a V-shaped surface 47 on the diametrically opposite side of this opening, and two flat parallel faces 48, 48 arranged on diametrically opposite sides of the axis of the cutting blade and connecting the respective ends of the curved and V-shaped faces 46, 47 of this opening, as shown in Fig. 5.

The periphery of the coupling head 41 on the protecting sleeve is made of the same shape as the opening 45 in the cutting blade so that this head when inserted therein these parts will fit tightly together and cause the cutting blade to be rotated positively and without liability to vibrate unduly when in use. For this purpose, as shown in Fig. 3 the periphery of the coupling head 41 is provided on one side of its axis with a curved surface 49 which is concentric with the axis of the driving shaft, a V-shaped face 50 on the diametrically opposite side of this curved surface, and two parallel surfaces 51 arranged on diametrically opposite sides of the shaft and connecting the corresponding ends of the curved and V-shaped surfaces 49, 50.

When operating a cutting blade which is mounted upon a driving shaft by these means the cutting blade will rotate in unison with the driving shaft and produce a normal cutting action on the work piece by reason of the gripping pressure exerted by the clamping disks against opposite sides of the cutting blade, during which time the outer side of the rear disk 31 is pressed against the shoulder 24 of the driving shaft and the screw nut 28 is pressed against the outer side of the front clamping disk. At this time the non-abrasive protecting member or sleeve 37 does not turn on the intermediate neck 23 of the driving shaft but instead turns therewith, and the cutting blade and protecting sleeve also turn with the shaft due to the interlock between the head 41 and the cutting blade.

When, however, the rotary movement of the cutting blade with the driving shaft is resisted sufficiently to over-come the frictional engagement of the clamping disks with opposite sides of the cutting blade, these disks will slip on the cutting blade and the latter will lag behind the rotary movement of the drive shaft. When such lagging in the movement of the cutting blade occurs the clamping disks move independently thereof and the driving shaft also turns in the bore of the protecting member 37 to a corresponding extent. Inasmuch, however, as the co-operating surface of the neck 23 on the driving shaft and the bore of the protecting sleeve 37 extend over a considerable area and the same are relatively smooth and non-abrasive no appreciable wear on the neck of the driving shaft occurs, and the driving shaft is therefore saved from undue wear on this part thereof as would occur if the same were engaged by the bore of an opening in the cutting blade which is made of abrasive material.

The modified form of this invention, as shown in Figs. 6, 7 and 8 is constructed as follows:

The numeral 52 represents a supporting bushing the cylindrical bore of which engages with the cylindrical periphery of the neck 23 of the driving shaft and projects with its front and rear ends into recesses 53, 54 formed centrally on the inner sides of the clamping disks 31, 34 around the driving shaft. This sleeve is interlocked with the rear clamping disk so as to be compelled to turn therewith by means of a pin 55 having an outer part arranged in the opening in the rear clamping disk and an inner part which projects into an opening in the rear part of the supporting bushing, as shown in Fig. 7. At its front end the supporting bushing is provided with an annular retaining flange 56.

Upon the periphery of the front part of the supporting bushing 52 is mounted a protecting ring 57 of non-abrasive material in which the bushing 52, at times is capable of turning. This protecting ring is held against axial movement relative to the driving shaft and the clamping disks by engagement of the front side of this ring with the flange 56 on the supporting bushing while the rear side of this ring engages with the inner side of the rear clamping disk 31.

The periphery of this protecting ring is of irregular or non-circular form, as shown at 59, and engages with a hole 60 of corresponding shape in the center of the cutting blade so that these members are compelled to rotate in unison.

Normally the shoulder 24 on the driving shaft and the screw nut 28 engage with the outer sides of the rear and front clamping disks and the latter engage with opposite sides of the cutting blade with sufficient grip that these several parts turn in unison.

When, however, the cutting blade engages with a hard spot on the work piece or its rotary movement with the driving shaft is retarded for any reason which would cause the cutting blade to slip between the clamping disks then the protecting ring 57 and cutting blade lag behind the rotation of the shaft and the supporting bushing 52 continues its rotary forward movement independently of the protecting ring and the cutting blade, thereby avoiding any wearing action of the cutting blade on the shaft as would occur if the abrasive saw or cutting blade engaged directly with a cylindrical surface of the shaft.

Instead of employing a non-abrasive protecting member which is independent of either of the clamping members this protecting member may be formed integrally with one of the clamping disks, as shown in Figs. 9 and 10.

As there shown the circular cutter disk 29 of abrasive material is gripped between front and rear clamping disks 60, 61 both of which are capable of turning on the driving shaft 63 under abnormal conditions but normally turn therewith by engagement of a shoulder 62 on the driving shaft with the rear clamping disk 61 and a screw nut 64 on this shaft bearing against the front clamping disk 60.

The inner side of the front clamping disk 60 is provided with a protecting member 65 which is formed integrally with this front disk and projects into an opening 66 in the center of the cutting blade.

This protecting member 65 and the clamping disk 60 are formed integrally of non-abrasive material, such as iron or the like which will not cut the driving shaft when turning thereon. The periphery of this protecting member 65 and the opening 66 in the cutting disk which co-operate are of non-circular form, as shown at 69 in Fig. 10, so that when these parts are assembled they are compelled to turn in unison.

In the operation of this invention, when constructed in accordance with Figs. 9 and 10, the cutting blade, clamping disks 60, 61 and shaft normally turn in unison due to the frictional engagement of the clamping disks with opposite sides of the cutting blade and engagement of the shaft shoulder 62 and the nut 64 with the outer sides of these disks. When, however, the rotation of the cutting blade is retarded or stopped for any reason and the driving shaft turns forwardly, independently thereof, both the clamping disks and the cutting blade may lag behind the rotation of the driving shaft and the latter may turn in the central openings of both clamping disks, or the rear clamping disk 61 may continue its forward movement with the driving shaft while the front clamping disk together with the cutting blade coupled thereto slip relative to the rear clamping disk and the shaft but under both of these conditions no part of the abrasive cutting blade engages with the surface of the driving shaft and no wearing action on the latter therefor occurs thereby saving the shaft from undue wear and avoiding unnecessary repairing thereof.

A further advantage derived from this invention is that by relieving the rotary driving spindle from any wear by the abrasive blade the latter is maintained in its centered position and thus prevented from vibrating excessively and breaking unduly frequent.

By thus avoiding breakage of cutting blades a considerable economy in the cost of doing work of this character is effected and unnecessary loss of time in operating the cutting apparatus is also eliminated.

I claim:

1. Means for mounting an abrasive cutter blade on a rotatable spindle, comprising a non-abrasive protecting sleeve rotatable on said spindle and provided with non-circular head which engages with a correspondingly shaped opening in the center of said blade and also having a coupling hub, two clamping disks rotatable relative to said spindle and protecting sleeve and engaging frictionally with opposite sides of said blade and one of said disks having a recess on its inner side which receives said hub, means for coupling said hub and the disk having said recess so as to permit said sleeve to turn on said spindle independently of said disk but prevent axial movement of said sleeve relative the respective disk, and means for frictionally connecting said disks with said spindle.

2. Means for mounting an abrasive cutter blade on a rotatable spindle, comprising a non-abrasive protecting sleeve rotatable on said spindle and provided with non-circular head which engages with a correspondingly shaped opening in the center of said blade and also having a coupling hub, two clamping disks engaging frictionally with opposite sides of said blade and one of said disks having a recess on its inner side which receives said hub, means for coupling said hub and the disk having said recess so as to permit said sleeve to turn on said spindle independently of said disk but prevent axial movement of said sleeve relative the respective disk, including annular grooves formed on opposing surfaces of said hub and said recess, a split-spring ring arranged in said grooves and extending across the joint between the same, and means for frictionally connecting said clamping disks with said spindle.

CHARLES A. MARTIN.

REFERENCES CITED

The following references are of record in the file of this patent:

UNITED STATES PATENTS

| Number | Name | Date |
|---|---|---|
| 158,617 | Bannister et al. | Jan. 12, 1875 |
| 1,314,125 | Burlew | Aug. 26, 1919 |
| 1,709,820 | Gammeter | Apr. 16, 1929 |
| 1,756,259 | Perks | Apr. 29, 1930 |
| 1,944,489 | Bockshe | Jan. 23, 1934 |
| 1,947,662 | Robinson | Feb. 20, 1934 |
| 2,259,554 | Clark | Oct. 21, 1941 |